United States Patent
Touge

(10) Patent No.: US 7,417,922 B2
(45) Date of Patent: Aug. 26, 2008

(54) OBSTACLE DETECTION DEVICE AND METHOD FOR ESTIMATING RECEIVING TIME

(75) Inventor: Hiroshi Touge, Ichinomiya (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 11/802,670

(22) Filed: May 24, 2007

(65) Prior Publication Data
US 2007/0274159 A1 Nov. 29, 2007

(30) Foreign Application Priority Data
May 25, 2006 (JP) ............... 2006-145223

(51) Int. Cl.
*G01S 15/93* (2006.01)
(52) U.S. Cl. .......................... 367/99; 367/98
(58) Field of Classification Search ........... 367/99, 367/98
See application file for complete search history.

(56) References Cited

U.S. PATENT DOCUMENTS
5,705,750 A * 1/1998 Mizukami et al. ............. 73/602

FOREIGN PATENT DOCUMENTS
JP  2002-372577 A  12/2002
JP  2005-69867 A  3/2005

* cited by examiner

*Primary Examiner*—Dan Pihulic
(74) *Attorney, Agent, or Firm*—Sughrue Mion, PLLC

(57) ABSTRACT

An obstacle detection device includes a transmitting portion for sending ultrasonic wave, a plurality of receiving portions provided at different positions and receiving reflected waves of the ultrasonic wave, a plurality of envelope wave acquiring portions for acquiring envelope waves corresponding to the reflected waves, on the basis of the reflected waves received by the receiving portions, determining portions for determining a peak of each of the envelope waves, storing portions for storing a partial data of the each of the envelope waves, whose peak is determined by the determining portions, estimating portions for estimating a starting point of the each of the envelope waves by using the partial and location determining portions for determining a location of an obstacle on the basis of the starting point of the each of the envelope waves.

16 Claims, 9 Drawing Sheets

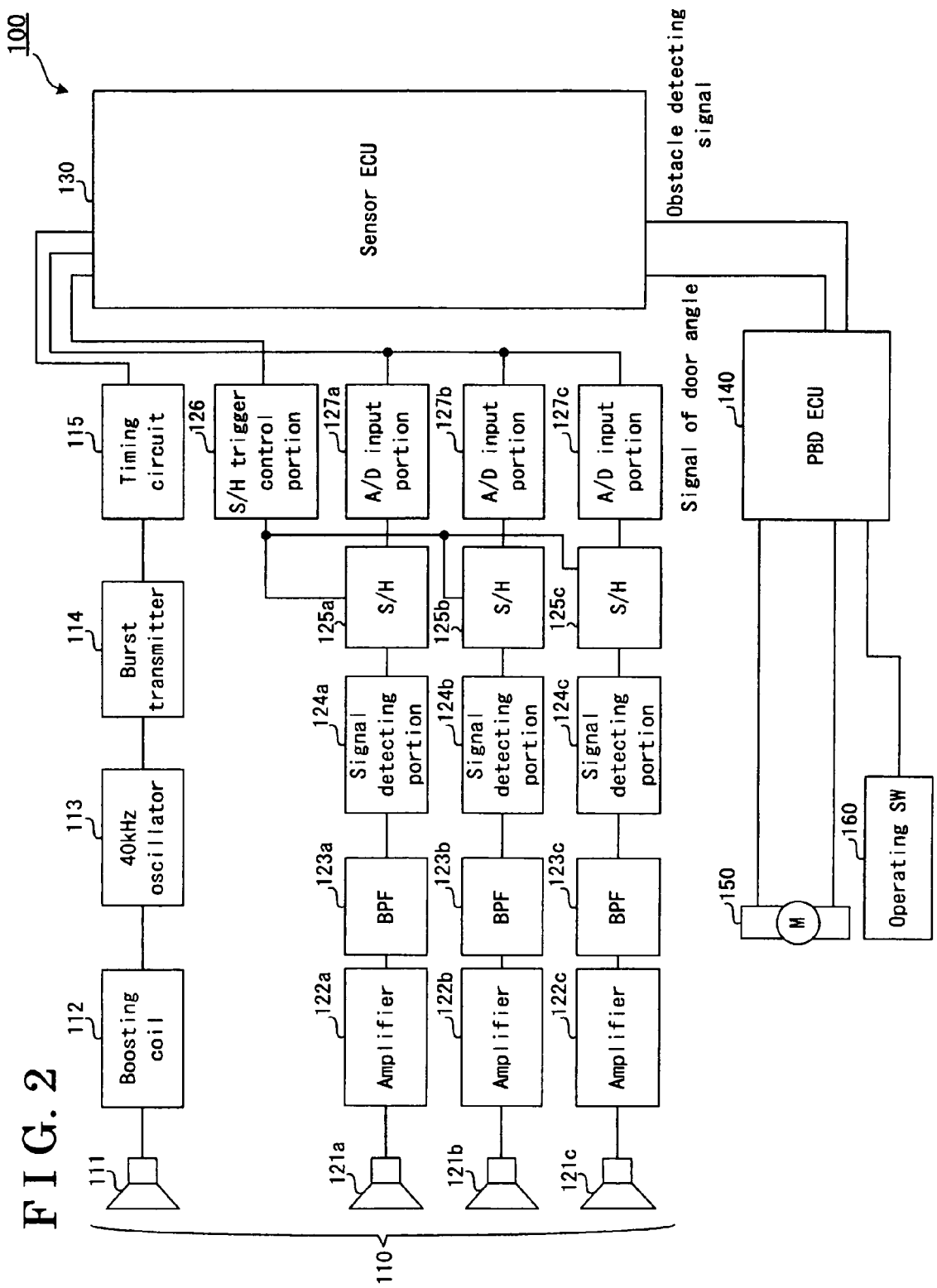

FIG. 4A

Table 200a:

| Time counter value | | | | | | | | | | | | | |
|---|---|---|---|---|---|---|---|---|---|---|---|---|---|
| Voltage value | | | | | | | | | | | | | |
| 1 | 2 | 3 | 4 | 5 | 6 | 7 | 8 | 9 | 10 | 11 | 12 | 13 | |

Table 200b:

| Time counter value | | | | | | | | | | | | | |
|---|---|---|---|---|---|---|---|---|---|---|---|---|---|
| Voltage value | | | | | | | | | | | | | |

Table 200c:

| Time counter value | | | | | | | | | | | | | |
|---|---|---|---|---|---|---|---|---|---|---|---|---|---|
| Voltage value | | | | | | | | | | | | | |

FIG. 4B (200a ~ 200c) 200

| Time counter value | 6000 | 6100 | 6200 | 6300 | 6400 | 6500 | 6600 | 6700 | 6800 | 6900 | 7000 | 7100 | 7200 |
|---|---|---|---|---|---|---|---|---|---|---|---|---|---|
| Voltage value | 2.87 | 2.13 | 1.98 | 2.45 | 3.11 | 2.79 | 3.14 | 3.61 | 4.06 | 4.57 | 5.00 | 4.21 | 3.73 |
| | −10 | −9 | −8 | −7 | −6 | −5 | −4 | −3 | −2 | −1 | 0 Peak | +1 | +2 |

| Estimated straight point of reflected wave (envelope wave) received by the receiving portion 121a | Estimated straight point of reflected wave (envelope wave) received by the receiving portion 121b | Estimated straight point of reflected wave (envelope wave) received by the receiving portion 121c |
|---|---|---|
| 8900 | 8520 | 8600 |

210

OBSTACLE DETECTION DEVICE AND METHOD FOR ESTIMATING RECEIVING TIME

CROSS REFERENCE TO RELATED APPLICATIONS

This application is based on and claims priority under 35 U.S.C. § 119 to Japanese Patent Application 2006-145223, filed on May 25, 2006, the entire content of which is incorporated herein by reference.

FIELD OF THE INVENTION

The present invention relates to an obstacle detection device for a vehicle, more particularly, to a device that estimates a more accurate receiving time of a reflected wave in order to estimate a location of an obstacle. The present invention further relates to an appropriate method for estimating the receiving time.

BACKGROUND

Obstacle detecting devices for a vehicle have been invented, some of which estimate a receiving time of a reflected wave accurately, even when amplitude of the received reflected wave is fluctuant. For example, one of such obstacle detection devices is disclosed in the Japanese Patent Publication JP2005-69867A.

The obstacle detection device disclosed in JP2005-69867A estimates an envelope (an envelope wave) of reflected wave, which are full-wave rectified, and then estimates an approximate straight line by approximating a starting point of the envelope wave using two points where the envelope wave intersects with two threshold values of the different voltage values. Then, the device estimates a time when the approximate straight line and 0 voltage (0V) of the voltage value are crossed (zero-cross time). In this configuration, even when the amplitudes of the reflected waves are fluctuated, and consequently inclination of the approximate straight line is changed, the point (value) of the zero-cross time is not fluctuated. Therefore, by the use of the zero-cross time, a receiving time of the reflected wave is accurately estimated, and eventually a location of the obstacle (a location and a direction) is precisely determined.

The obstacle detection device disclosed in JP2005-69867A estimates the approximate straight line that approximates the upstroke of the envelope wave. However, when a rise occurs on the upstroke of the envelope wave, this known obstacle detecting has difficulties in estimating the appropriate approximate straight line. As a consequence, the accurate zero-cross time is not calculated. For example, as shown in FIG. 11, when a rising occurs on the upstroke of the envelope wave, an approximate straight line L11 or an approximate straight line L12, which correspond to each rise, are calculated, and thus resulting in a failure to recognize an approximate straight line L13 as a primary approximate straight line. Therefore, the zero-cross time T3 of the approximate straight line L13 differs from the zero-cross time T1 of the approximate straight lines L11 and/or the zero-cross time T2 of the approximate straight line L12. As a consequence, a level of accuracy in determining a distance and a direction of the obstacle eventually decreases.

A need thus exists to provide an obstacle detection device and a method for estimating the receiving time that calculate the receiving time of each of the reflected waves accurately by appropriately determining a peak of the envelope wave, and consequently detect a location of an obstacle with accuracy.

SUMMARY OF THE INVENTION

According to an aspect of the present invention, an obstacle detection device includes transmitting means for transmitting ultrasonic wave, a plurality of receiving means provided at different positions and receiving reflected waves of the ultrasonic wave, which is transmitted by the transmitting means, a plurality of envelope wave acquiring means for acquiring envelope waves corresponding to the reflected waves, on the basis of the reflected waves received by the receiving means, determining means for determining a peak of each of the envelope waves, which is acquired by the envelope wave acquiring means, storing means for storing a partial data of the each of the envelope waves, whose peak is determined by the determining means, estimating means for estimating a starting point of the each of the envelope waves by using the partial data stored by the storing means, and location determining means for determining a location of an obstacle on the basis of the starting point of the each of the envelope waves, the starting point being estimated by estimating means.

According to another aspect of the present invention, a method for estimating receiving time, the method used for an obstacle detection device, which outputs ultrasonic wave from a transmitting portion and receives reflected waves of the ultrasonic wave by receiving portions provided at different positions, includes an envelope wave acquiring step in which an envelope wave corresponding to each of the reflected waves received by each receiving portion is acquired, a determining step in which a peak acquired by the envelope wave acquiring step, is determined, a storing step in which a partial data of the envelope wave, whose peak is determined by the determining step and is stored in a table and, estimating step in which a receiving time of the each reflected wave received by the each receiving portion is estimated by using the partial data stored by the storing step.

BRIEF DESCRIPTION OF THE DRAWINGS

The foregoing and additional features and characteristics of the present invention will become more apparent from the following detailed description considered with reference to the accompanying drawings, wherein:

FIG. 2 illustrates a configuration of an obstacle detection device to which the embodiment of the invention is applied;

FIGS. 4A and 4B illustrate sampling tables;

FIG. 10 illustrates another method to calculate an approximate straight line and the like.

DETAILED DESCRIPTION

Figure 1A:
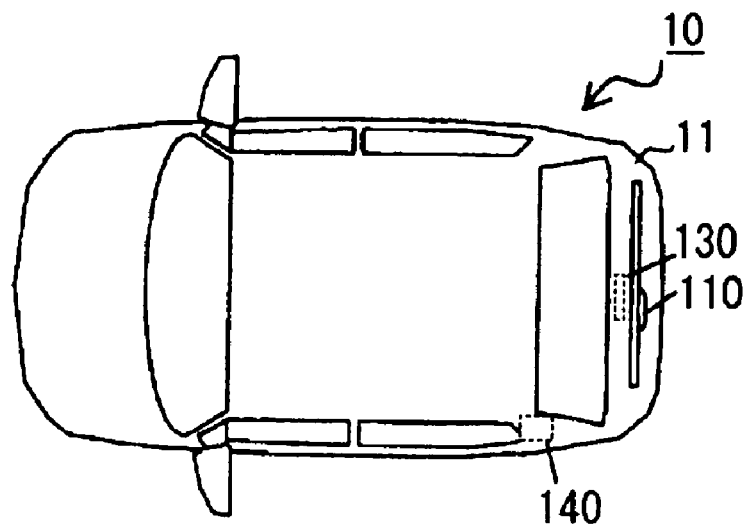
FIGS. 1A and 1B illustrate a vehicle to which the embodiment of this invention is applied.
Figure 1B:
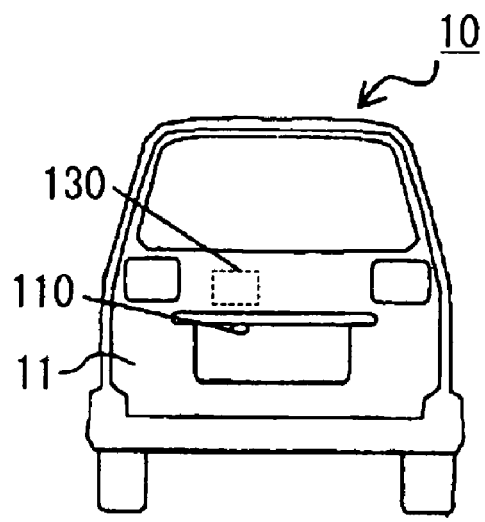

Embodiments of the present invention will be described below with reference to the attached drawings. An obstacle detection device 100 is, for example, applied to a hatchback car which has a flip-up type power back door (hereinafter referred to as PBD 11) as shown in FIGS. 1A and 1B. A sensor unit 110, an electronic control unit sensor 130, hereinafter referred to as sensor ECU 130 (e.g., serving as determining means, storing means, estimating means and location determining means) and a PBD ECU 140 are appropriately provided at the vehicle 10.

The obstacle detection device 100 includes a transmitting portion 111 (e.g., serving as transmitting means), a boosting coil 112, a 40 kHz oscillator 113, a burst transmitter 114, a timing circuit 115, receiving portions 121a, 121b and 121c (e.g., serving as receiving means), amplifiers 122a, 122b and 122c, band-pass-filters (here onward referred to as BPFs) 123a, 123b and 123c, signal detecting portions 124a, 124b and 124c (e.g., signal detecting means), sample and hold (here onward referred to as S/H) portions 125a, 125b and 125c, a S/H trigger control portion 126 (e.g., sampling controlling means), analog to digital (A/D) input portions 127a, 127b and 127c (e.g., sampling means), the sensor ECU 130, the PBD ECU 140, a motor 150 and an operating switch (SW) 160. The signal detecting portions 124, the S/H portions 125, the S/H trigger control portion 126 and the A/D input portions 127 correspond to envelope wave acquiring means. The S/H portions 125, the S/H trigger control portion 126 and the A/D input portions 127 correspond to sampling means.

The transmitting portion 111 is comprised of a piezoelectric element and the like, which has a cover. The transmitting portion 111 oscillates in accordance to a driving voltage which is supplied by the boosting coil 112 and transmits ultrasonic wave (transmitting wave) through a cover that functions as a resonator. The boosting coil 112 increases pulse voltage that is provided by the 40 kHz oscillator 113 and supplies driving voltage to the transmitting portion 111.

The 40 kHz oscillator 113 converts burst wave, which is supplied by the burst transmitter 114, into 40 kHz pulse wave and then supplies the pulse wave to the boosting coil 112. The burst transmitter 114, which is controlled by the timing circuit 115, supplied burst wave to the 40 kHz oscillator 113. The timing circuit 115 is controlled by the sensor ECU 130 so that the burst wave from the burst transmitter 114 can be supplied at a constant timing, for example, every 0.1 second.

Figure 3:
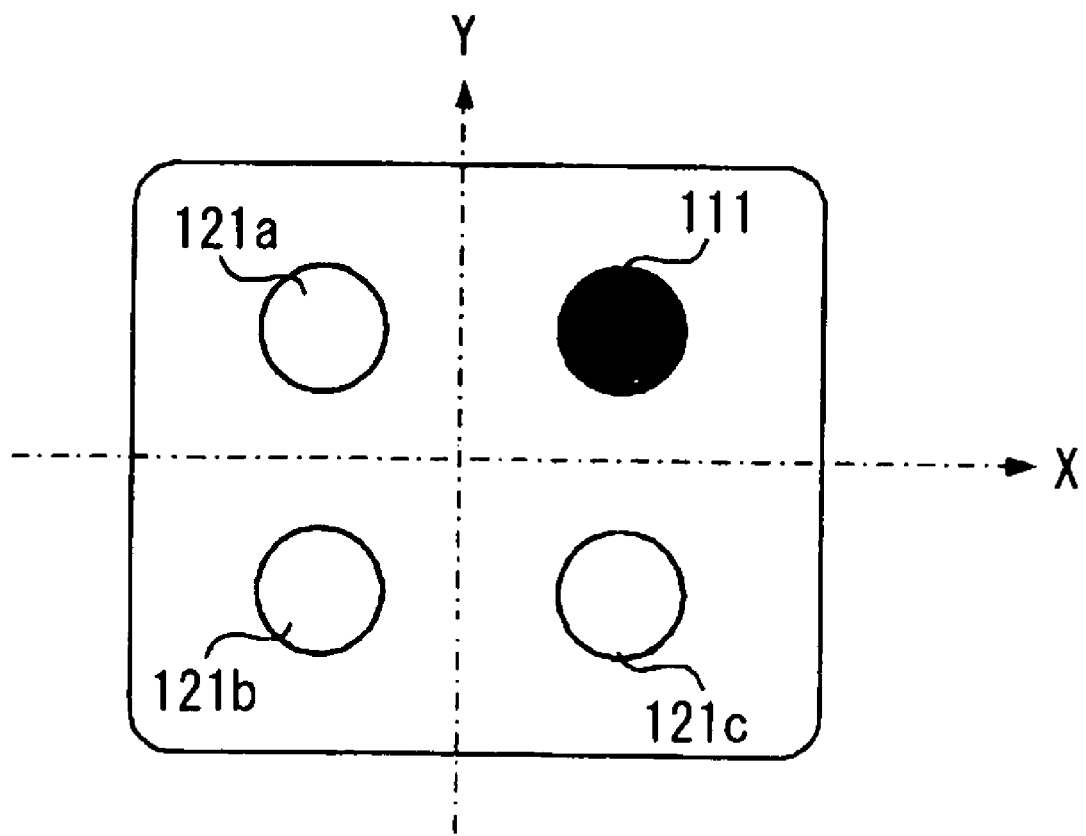
FIG. 3 illustrates a plan of a sensor unit.

The receiving portions 121 are comprised of a piezoelectric element and the like, which have a cover that functions as a resonator. The receiving portions 121 receive reflected waves of the ultrasonic wave (the ultrasonic wave is reflected by the obstacle forming the reflected waves) outputted by the transmitting portion 111. Then, the receiving portions 121 generate electromotive forces (signals) corresponding to pressure caused by receiving the reflected waves, and then output the signals to the amplifier 122. The sensor unit 100 is comprised of the transmitting portion 111 and the receiving portions 121. The sensor unit 100 is mounted, for example, in the vicinity of a license plate lamp provided at the PBD 11 as shown in FIGS. 1A and 1B. More specifically, as shown in FIG. 3, the receiving portion 121a and the receiving portion 121b are vertically aligned, and the transmitting portion 111 and the receiving portion 121c are vertically aligned. Those two vertical lines formed by the sending and receiving portions are allocated parallel to each other. Furthermore, the receiving portion 121b and the receiving portion 121c are horizontally aligned, and the receiving portion 121a and the transmitting portion 111 are horizontally aligned. Those two horizontal lines formed by the sending and receiving portions are allocated parallel to each other. Therefore, the transmitting portion 111 and the receiving portions 121 form a square-shape. Additionally, in this configuration, the transmitting portion 111 sends the ultrasonic wave and the receiving portions 121 receive the reflected waves. However, the configuration may be modified alternatively in a manner that the transmitting portion 111 is not provided, and instead, one of the receiving portions 121 has a combination of the sending and receiving functions.

Returning to FIG. 2, the amplifiers 122 (122a, 122b and 122c) amplify the signals, which are outputted by the receiving portion 121, and supply the amplified signals to the BPFs 123. The BPFs 123 (123a, 123b and 123c) receive the signals from the amplifiers 122 and filter the received signals in order to select signals whose frequency exists in a predetermined frequency range. Then, the selected signals are provided to the signal detecting portions 124 (124a, 124b and 124c).

The signal detecting portions 124, which comprise full-wave rectification circuits and the like, rectify the signals that pass through the BPFs 123 and provide the rectified signals to the S/H potions 125 (125a, 125b and 125c). The S/H portions 125 are controlled by the S/H trigger control portion 126 in order to take samples of the signals, which are rectified by the signal detecting portions 124, and temporally store the samples so that the A/D input portions 127 can convert analog signals into digital signals.

The S/H trigger control portion 126 is controlled by the sensor ECU 130 in order to generate trigger signals necessary for sampling and holding executed by the S/H portions 125. Specifically, the S/H trigger control portion 126 controls each S/H portion 125 so that each S/H portion 125 takes samples at the same timing. Each A/D input portion 127 is comprised of the integral type-A/D converter and the like. The A/D input portion 127 converts voltage of an analog signal into a digital voltage value and provides the digital voltage value to the sensor ECU 130. The voltage value corresponding to the value of an envelope of the reflected wave (envelope wave) as follows. Firstly, the signals received by each receiving portion 121 are amplified, and then the amplified signals are implemented full-wave rectification by each signal detecting portion 124, and finally the rectified signals are integrated by each A/D input portion 127. Additionally, the voltage value is received, for example, each time when a time counter value in the sensor ECU 130 increases by 100. In other words, sampling cycles of the voltage value are set in every 100 of the time counter.

Figure 5:
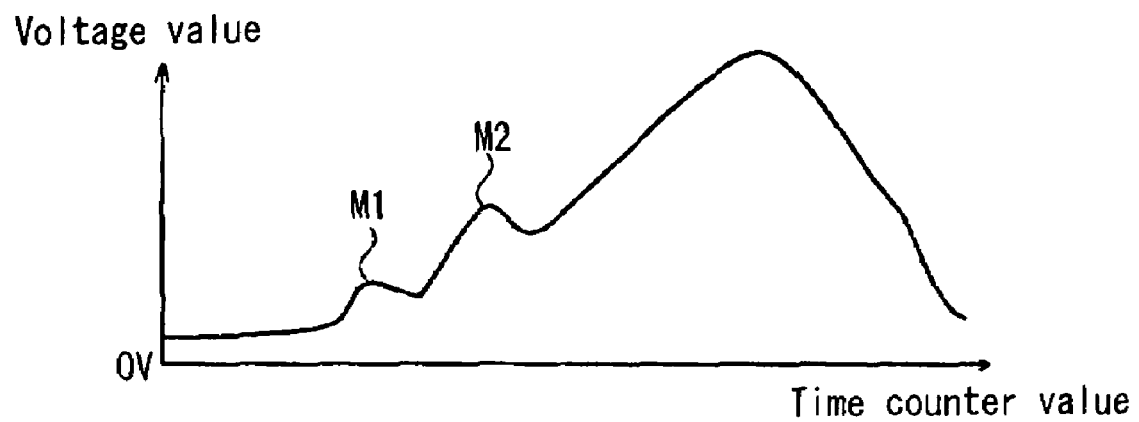
FIG. 5 illustrates one example of envelope waves, which are determined by a sensor ECU by using reflected waves.

The sensor ECU 130 controls the timing circuit 115 so as to transmit the ultrasonic wave from the transmitting portion 111. Moreover, the sensor ECU 130 starts measuring the time by using the time when the ultrasonic wave is sent as a fiducial point. When the sensor ECU 130 receives the voltage values of the envelope waves, which are effective as the reflected waves in a range of certain values of the time counter, from the A/D input portions 127, the sensor ECU 130 stores the corresponding voltage and time counter values into sampling tables. For example, the sensor ECU 130 includes an internal memory, in which areas for sampling tables 200a, 200b and 200c are secured, as shown in FIG. 4A. The voltage values, which are transmitted by the each A/D input portion 127, and the time counter values that correspond to the voltage values into each sampling table. More specifically, each sampling table 200 functions as annular buffers, by which data of the latest 13 sampling cycles are stored consistently. Hereinafter, means for determining a peak of the envelope wave will be explained with an example of one of the sampling tables 200. After the voltage value consecutively increases at least twice, and then the voltage value decreases, the sensor ECU 130 determines the voltage value immediately before the decrease of the voltage value (one previous cycle of sampling) as a peak of the envelope wave. Then, the sensor ECU 130 temporally stops storing data when the sensor ECU 130 stores data of one more sampling cycle after the voltage value decreases (data of two sampling cycles after the peak). In other words, when the sensor ECU 130 temporally stops storing data, data of previous ten sampling cycles from the peak (−10 to −1), the data of the peak of the voltage value (0) and data of the following two sampling cycles from the peak (+1 and +2) are stored in the sampling table 200, as shown in FIG. 4B. The peaks of the other two envelope waves are determined in the same way as described above. Consequently, even though rises M1 and M2 in the upstroke of the envelope wave as shown in FIG. 5 occur, since the sensor ECU 130 determines the peak of the envelope wave when the condition that the voltage value increases consecutively at least twice and then the voltage value decreases is fulfilled, chances of error that M1 or M2 are determined as a peak of the envelope wave are reduced.

Figure 6:
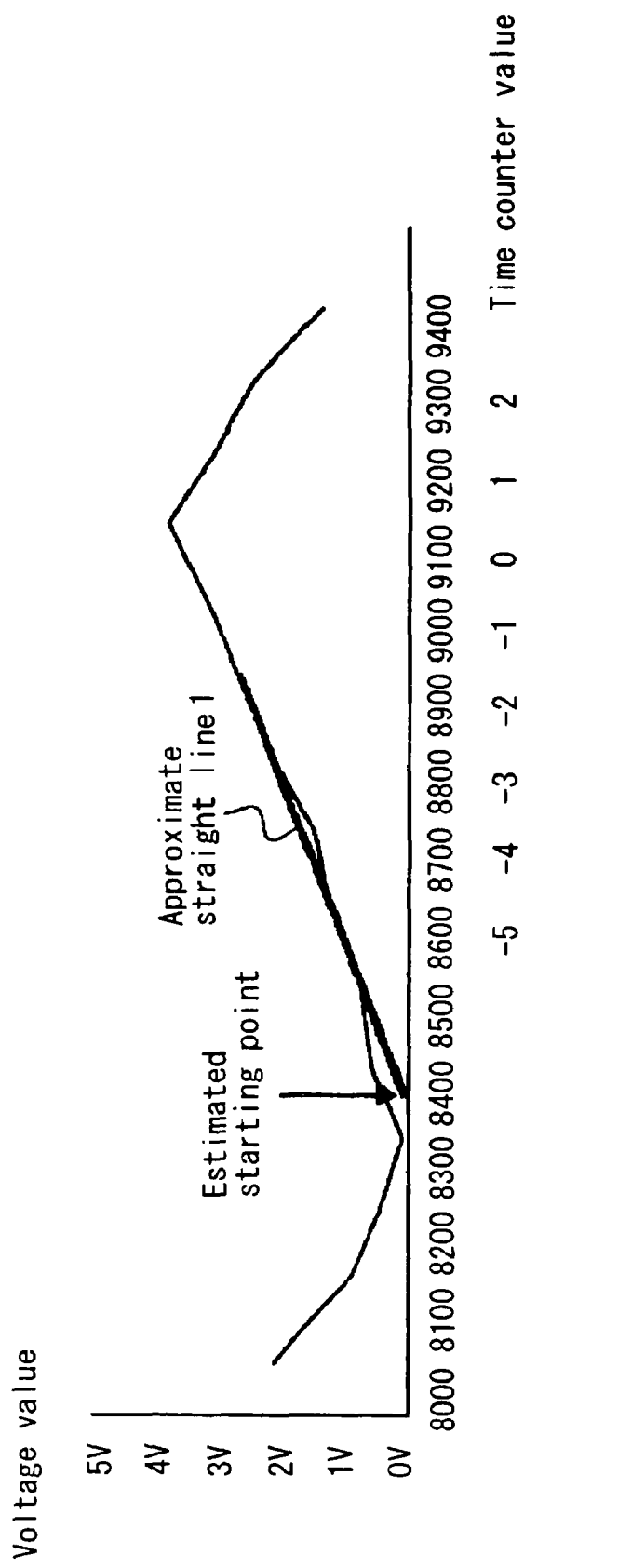
FIG. 6 illustrates an explanation on how an approximate straight line and an estimated staring point are calculated.
Figures 7, 8:
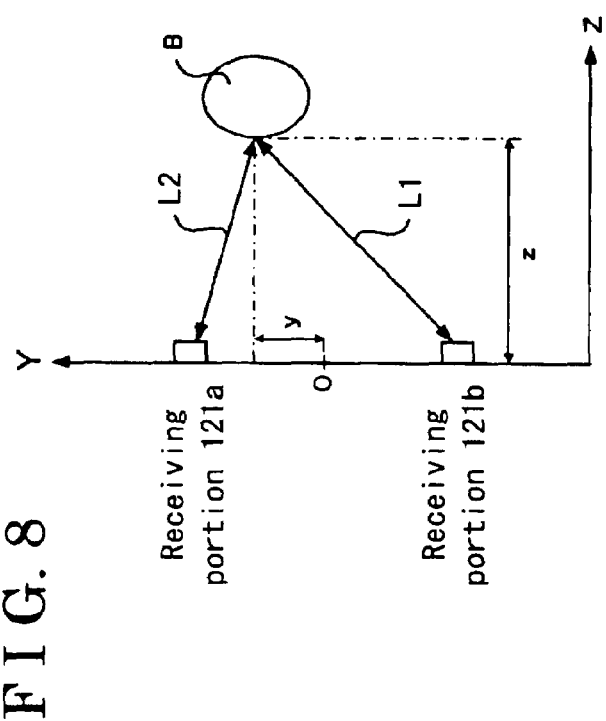
FIG. 7 illustrates an estimated value table.
FIG. 8 illustrates a method of determining a location of an obstacle.

Moreover, the sensor ECU 130 estimates the time of a starting point of the envelope wave by using the sampling table 200 storing the data in which the top of the envelope wave is determined. For example, the sensor ECU 130 calculates an approximate straight line by using data of previous five to two sampling cycles (−5 to −2) with reference of the data of the peak of the envelope wave, and then calculates the time when the approximate straight line crosses the 0 voltage (0V) of the voltage value (zero-cross time). In other words, the sensor ECU 130 estimates the time of the starting point of the envelope wave, whose peak is determined. For example, in a case of the envelope wave shown in FIG. 6, the sensor ECU 130 determines the time counter value of 8400 as an estimated starting point by using the voltage value of each sampling cycles from −5 to −2 and then calculating an approximate straight line 1 by means of the least-square method. Then, the sensor ECU 130 calculates such estimated starting point for each sampling table 200, and then sets each estimated staring point to each estimated value table 210, as shown in FIG. 7.

The sensor ECU 130 determines the estimated staring points of the estimated value table 210 as the receiving times when the reflected wave is received, and then determines a three-dimensional location of the obstacle by means of triangulation. Thus, for example, a location y of y-axis of an obstacle B (a coordinate value) and a location of z-axis of the obstacle B (a distance z) are determined by using the receiving time when the reflected wave is received by the receiving portions 121a and 121b. More specifically, following equations are formulated;

$$L1 = C*T1/2$$

$$L2 = C*T2 - L1$$

In this example;
L1 represents a distance between the receiving portion 121b and the obstacle B,
L2 represents another distance between the receiving portion 121a and the obstacle B,
C represents a speed of the ultrasonic wave,
T1 represents the estimated starting point of the reflected waves (the envelope waves) received by the receiving portion 121a,
T2 represents the estimated starting point of the reflected waves (the envelope waves) received by the receiving portion 121b.

Here, assuming D as the distance between the receiving portions 121a and 121b, y and z can be formulated as following equations:

$$y = D/2 - (D^2 + L2^2 - L1^2)/(2*D)$$

$$z = \sqrt{\{L2^2 - ((D^2 + L2^2 - L1^2)/(2*D))^2\}}$$

Similarly, a location x in a x-axis direction of the obstacle B (the coordinate value) and a location z in a z-axis direction of the obstacle B (the distance z) are determined by using the receiving times of the receiving portions 121b and 121c.

In this way, the sensor ECU 130 determines the location of the obstacle. When the obstacle locates in the vicinity of the PBD 11 (for example, when the obstacle locates in a range of opening and closing motions), the sensor ECU 130 provides obstacle detecting signals to the PBD ECU 140.

The PBD ECU 140 responds to an indicating signal from the operating SW, and then actuates the motor 150 so as to open or close the PBD 11. In addition, the PBD ECU 140 provides a door angle signal to the sensor ECU 130 of the PBD 11, which is to be opened or closed. Additionally, the PBD ECU 140 stops the motor 150 after the obstacle detecting signals are provided from the sensor ECU 130.

The motor 150 is actuated by control of the PBD ECU 140, and then opens or closes the PBD 11. The operating SW 160, which is operated by a user, and then the opening SW provides the indicating signals to the PBD ECU 140.

Figure 9:
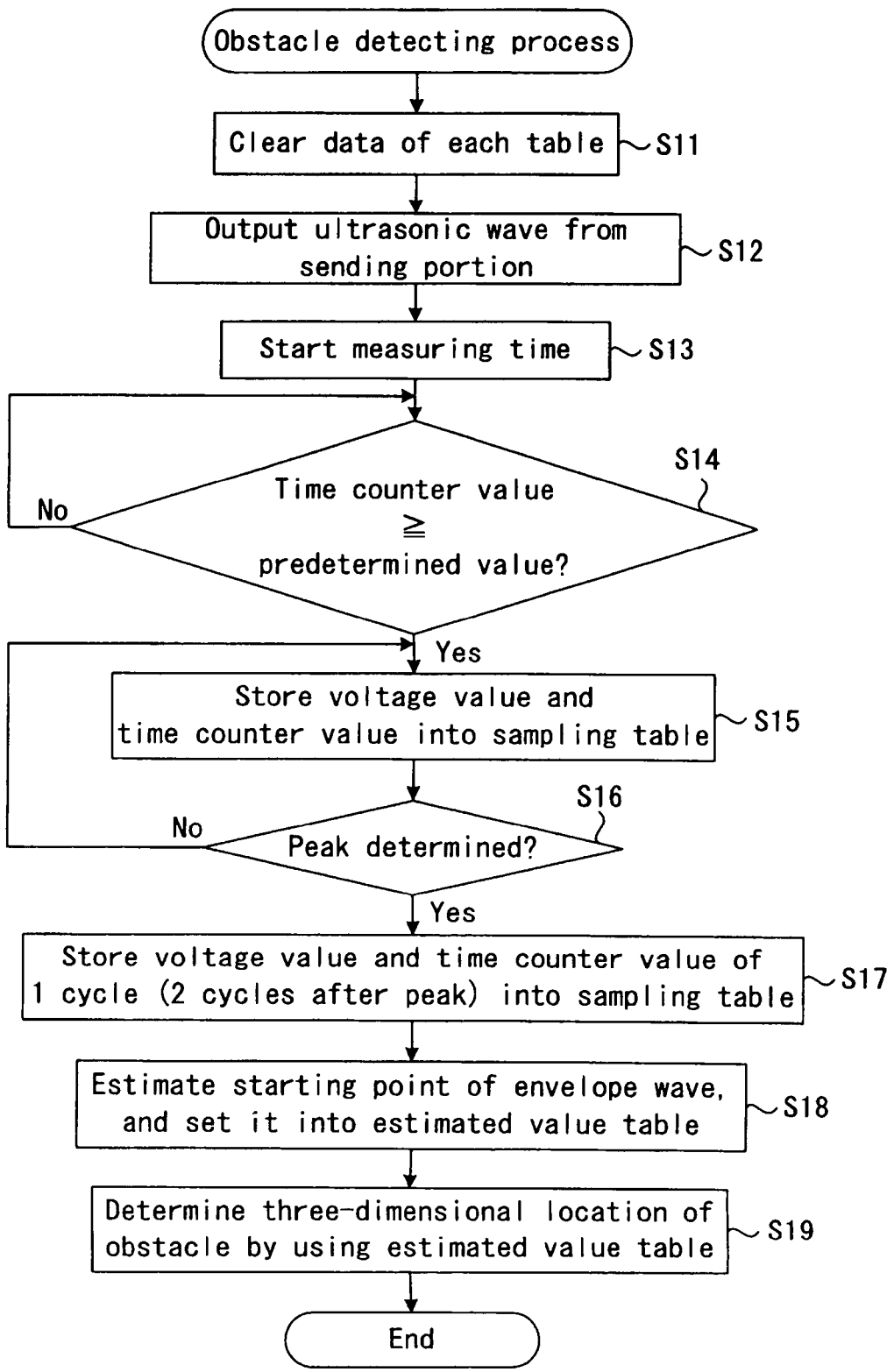
FIG. 9 illustrates a flowchart that explains an obstacle detecting process is.

Here, an operation of the above-mentioned obstacle detection device 100 will be explained. For example, when the vehicle 10 is driven backwards (reverse) or when the PBD 11 is opened or closed, the obstacle detection device 100 starts obstacle detection process as shown in a flowchart of FIG. 9. Additionally, this obstacle detection process will be repeated until the reverse operation of the vehicle 10 or the opening or closing of the PBD11 is completed.

In the obstacle detecting process, the sensor ECU 130 first clears the data stored in each table (Step S11). Specifically, the sensor ECU 130 clears all of the data in the sampling tables 200 (200a, 200b and 200c) and the estimated value table 210.

Then, the sensor ECU 130 controls the timing circuit 115 so that the transmitting portion 111 transmits the ultrasonic wave (Step S12). At the same time, the sensor ECU 130 starts measuring time (Step S13). In other words, the sensor ECU 130 starts counting the time counter value from the time when the ultrasonic wave transmitted by the transmitting portion 111.

The sensor ECU 130 stands by for proceeding a following process until the time counter value becomes equal to or exceeds a predetermined value (Step S14). Specifically, the sensor ECU 130 stands by until effective reflected waves are receivable.

When the time counter value becomes equal to or exceeds the predetermined value, the sensor ECU 130 stores the voltage value received from each A/D input portions 127 (127a, 127b and 127c) and stores the time counter value at the time to each sampling table 200, which functions as the annular buffers (Step S15, e.g., envelope wave acquiring step).

Hereinafter, the process for determining the peaks of the envelope waves is explained referring to one of the sampling tables 200, as the each sampling tables takes the same process. The sensor ECU 130 determines whether or not the peak of the envelope wave is distinguished from the data stored in the sampling table 200 (Step S16, e.g., peak determining step). Specifically, when the voltage value consecutively increases at least twice and then decreases, the sensor ECU 130 determines the previous voltage value immediately before the decrease of the voltage value (one previous sampling cycle) as the peak of the envelope wave.

When the peak of the envelope wave is not determined, the sensor ECU 130 returns to step S15. Then the sensor ECU 130 stores data of the following sampling timing (sampling cycles) to the sampling table 200. On the other hand, when the peak of the envelope wave is determined, the sensor ECU 130 stores data of one more sampling cycle after the peak (two sampling cycles after the peak) to the sampling table 200 (Step S17, e.g., storing step). Then, the sensor ECU temporally stops storing data.

The sensor ECU 130 estimates the time of the starting point from the sampling table 200, which includes such data of the peak, and then sets the estimated starting point to the estimated value table 210 (Step S18, e.g., estimating step). For example, the sensor ECU 130 calculates the approximate straight line by using data of previous five to two sampling cycles (−5 to −2) from the peak of the envelope wave, and then calculates the time when the approximate straight line crosses 0 voltage (0V) of the voltage value (calculates a zero-cross time), and then determines the starting point of the envelopes wave whose peak is determined. Further, the sensor ECU 130 calculates the estimated value of the staring point of each sampling table 200, and then sets the estimated values in the estimated value table 210.

Furthermore, the sensor ECU 130 determines the three-dimensional location of the obstacle by using the estimated value table 210 (Step S19). Specifically, the sensor ECU 130 determines the estimated staring points of the estimated value table 210 as the receiving time, when the reflected waves are received, of the receiving waves, and then determines a three-dimensional location by means of triangulation. Additionally, when the determined location of the obstacle is located in the vicinity of the PBD 11, the sensor ECU 130 prevents the PBD 11 from contacting the obstacle by supplying the obstacle detecting signal to the PBD ECU 140.

In such obstacle detecting process, the sensor ECU 130 determines the peak of the envelope wave for each sampling table 200. And then the sensor ECU 130 estimates the approximate straight line of the appropriate starting point of the envelope wave by using each data of previous 5 to 2 sampling cycles from the peaks. This approximate straight lines are not affected by a situation when there are rises in the upstroke, therefore the zero-cross time (the estimated value of the starting time), which is estimated from the approximate straight line, will be appropriate. As a result, the location of the obstacle can be eventually more accurately estimated.

Figure 10:
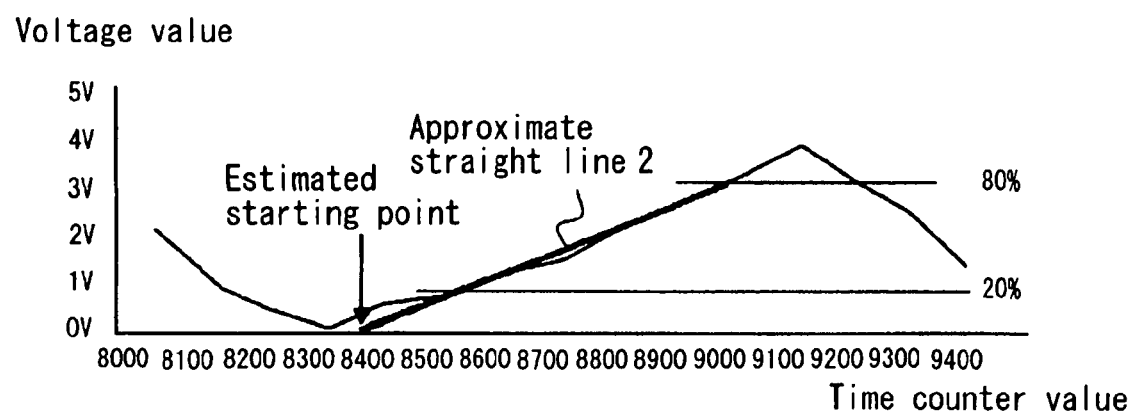
Figure 11:
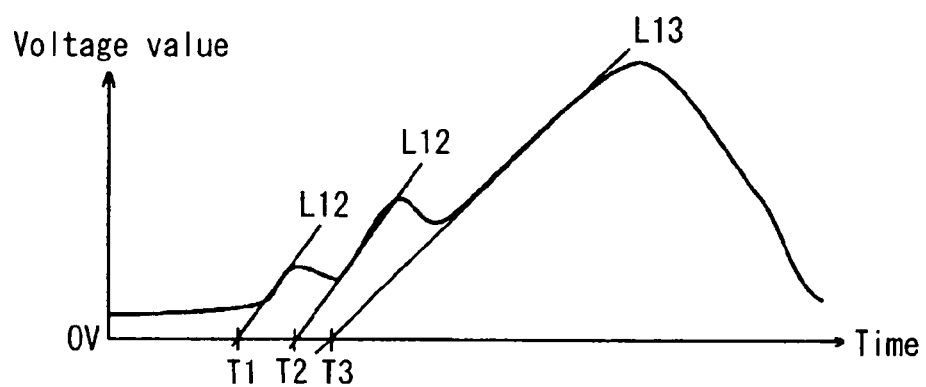
FIG. 11 illustrates one example of envelope waves for explaining a known obstacle detection device.

This invention is not limited to the embodiment explained above, and further may be modified and adopted in various situations. For example, the above embodiment is explained with a case where the approximate straight line for each sampling table 200 is calculated by using each data of previous 5 to 2 sampling cycles from the peak. However, other methods can be applied so as to estimate approximate straight lines. More specifically, as shown in FIG. 10, one example of other methods estimates an approximate straight line 2 for one of the sampling tables 200, which is the inclination of the voltage values in a range of, for example, 20% to 80% of a peak voltage value, which is obtained at the peak of the envelope wave. Then, the zero-crossed time of the approximate straight line 2 is estimated as a starting point, by which the time counter value, for example, 8400 is determined. That is to say, in this case also, the estimated starting point will be calculated by using the appropriate approximate straight line 2, in the same way as the approximate straight line 1 is used to calculate the estimated starting point in FIG. 6.

The above embodiment explains how to estimate the envelope waves by rectifying reflected waves, which are received by the receiving portions 121, and then by integrating the rectified signals. However, instead of this method, the envelope waves can be estimated by firstly sampling the received reflected waves and integrating the signals, and then rectifying the waves.

In the above embodiment, the ultrasonic wave is used to determine the location of the obstacle. However, a laser or an electromagnetic wave may be used instead of ultrasonic wav.

In the above embodiment, the obstacle detection device is provided to the PBD 11 in order to monitor in the vicinity of the PBD 11. However, the sensor unit may be provided to, for example, side mirrors in order to monitor obstacles adjacent to each door.

The system configuration and the flowchart described above shows only an example and a modification may be applied, if needed.

According to the present obstacle detection device, the location of the obstacle is accurately determined by appropriately determining the peaks of the envelope waves, and by calculating the receiving times of the reflected waves with more accuracy. Moreover, according to the method for estimating receiving time of the present invention, the receiving times of the reflected waves are accurately calculated by appropriately determining the peaks of the envelope waves.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. An obstacle detection device comprising:
    transmitting means for transmitting an ultrasonic wave;
    a plurality of receiving means provided at different positions and receiving reflected waves of the ultrasonic wave, which is transmitted by the transmitting means;
    a plurality of envelope wave acquiring means for acquiring envelope waves corresponding to the reflected waves, on the basis of the reflected waves received by the receiving means;
    determining means for determining a peak of each of the envelope waves, which is acquired by the envelope wave acquiring means;
    storing means for storing a partial data of the each of the envelope waves, whose peak is determined by the determining means;
    estimating means for estimating a starting point of the each of the envelope waves by using the partial data stored by the storing means; and
    location determining means for determining a location of an obstacle on the basis of the starting point of the each of the envelope waves, the starting point being estimated by estimating means.

2. The obstacle detection device according to claim 1, wherein, when a condition that a voltage value of the each of the envelope waves, which are obtained at preset sampling timings, increases consecutively at least two times and then the voltage value decreasing is fulfilled, the determining means determines the voltage value obtained immediately before the voltage value decrease as the peak for the each of the envelope waves.

3. The obstacle detection device according to claim 2, wherein the estimating means estimates the starting point of the each of the envelope waves by calculating an approximate straight line with the use of the partial data of the each of the envelope waves, whose peak is determined, the partial data being in a range between the sampling timing of previous five cycles from the peak and the sampling timing of previous two cycles from the peak, and by calculating a zero-cross time of the each calculated approximate straight line.

4. The obstacle detection device according to claim 1, wherein the estimating means estimates the starting point of the each of the envelope waves by calculating an approximate straight line by using the partial data of the each of the envelope waves, whose peak is determined, the partial data being in a range of 20% to 80% of a peak voltage value, and by calculating a zero-cross time for the each calculated approximate straight line.

5. The obstacle detection device according to claim 2, wherein the estimating means estimates the starting point of the each of the envelope waves by calculating an approximate straight line by using the partial data of the each of the envelope waves, whose peak is determined, the partial data being in a range of 20% to 80% of a peak voltage value, and by calculating a zero-cross time for the each calculated approximate straight line.

6. The obstacle detection device according to claim 1, wherein the envelope wave acquiring means includes: signal detecting means for rectifying the each reflected wave received by the receiving means; and sampling means for sampling the each of the envelope waves corresponding to the each reflected wave by integrating the each reflected wave rectified by the signal detecting means.

7. The obstacle detection device according to claim 2, wherein the envelope wave acquiring means includes: signal detecting means for rectifying the each reflected wave received by the receiving means; and sampling means for sampling the each of the envelope waves corresponding to the each reflected wave by integrating the each reflected wave rectified by the signal detecting means.

8. The obstacle detection device according to claim 3, wherein the envelope wave acquiring means includes: signal detecting means for rectifying the each reflected wave received by the receiving means; and sampling means for sampling the each of the envelope waves corresponding to the each reflected wave by integrating the each reflected wave rectified by the signal detecting means.

9. The obstacle detection device according to claim 4, wherein the envelope wave acquiring means includes: signal detecting means for rectifying the each reflected wave received by the receiving means; and sampling means for sampling the each of the envelope waves corresponding to the each reflected wave by integrating the each reflected wave rectified by the signal detecting means.

10. The obstacle detection device according to claim 5, wherein the envelope wave acquiring means includes: signal detecting means for rectifying the each reflected wave received by the receiving means; and sampling means for sampling the each of the envelope waves corresponding to the each reflected wave by integrating the each reflected wave rectified by the signal detecting means.

11. The obstacle detection device according to claim 6, wherein the envelope wave acquiring means includes sampling controlling means for controlling the sampling timing of the each of the envelope waves to be equal.

12. The obstacle detection device according to claim 7, wherein the envelope wave acquiring means includes sampling controlling means for controlling the sampling timing of the each of the envelope waves to be equal.

13. The obstacle detection device according to claim 8, wherein the envelope wave acquiring means includes sampling controlling means for controlling the sampling timing of the each of the envelope waves to be equal.

14. The obstacle detection device according to claim 9, wherein the envelope wave acquiring means includes sampling controlling means for controlling the sampling timing of the each of the envelope waves to be equal.

15. The obstacle detection device according to claim 10, wherein the envelope wave acquiring means includes sampling controlling means for controlling the sampling timing of the each of the envelope waves to be equal.

16. A method for estimating receiving time, the method used for an obstacle detection device, which outputs ultrasonic wave from a transmitting portion and receives reflected waves of the ultrasonic wave by receiving portions provided at different positions, comprising:

an envelope wave acquiring step in which an envelope wave corresponding to each of the reflected waves received by each receiving portion is acquired;

a determining step in which a peak acquired by the envelope wave acquiring step, is determined;

a storing step in which a partial data of the envelope wave, whose peak is determined by the determining step and is stored in a table; and an estimating step in which a receiving time of the each reflected wave received by the each receiving portion is estimated by using the partial data stored by the storing step.

* * * * *